US010334302B2

(12) United States Patent
Viveganandhan et al.

(10) Patent No.: US 10,334,302 B2
(45) Date of Patent: Jun. 25, 2019

(54) METHOD AND SYSTEM FOR SEGMENT BASED RECORDING

(71) Applicant: SYNAMEDIA LIMITED, Middlesex (GB)

(72) Inventors: Mahesh Viveganandhan, Cupertino, CA (US); Hoi-Tauw Jozef Chou, San Ramon, CA (US); Gowdish Kumaraswamy, Milpitas, CA (US); Clint Ricker, Lawrenceville, GA (US)

(73) Assignee: SYNAMEDIA LIMITED, Middlesex (GB)

( * ) Notice: Subject to any disclaimer, the term of this patent is extended or adjusted under 35 U.S.C. 154(b) by 0 days.

(21) Appl. No.: 14/883,681

(22) Filed: Oct. 15, 2015

(65) Prior Publication Data
US 2017/0105036 A1  Apr. 13, 2017

Related U.S. Application Data

(60) Provisional application No. 62/238,727, filed on Oct. 8, 2015.

(51) Int. Cl.
*H04N 21/2747* (2011.01)
*H04N 21/235* (2011.01)
(Continued)

(52) U.S. Cl.
CPC ....... *H04N 21/2747* (2013.01); *G11B 27/034* (2013.01); *H04N 21/2353* (2013.01);
(Continued)

(58) Field of Classification Search
CPC ......... H04N 21/2181; H04N 21/23103; H04N 21/4135; H04N 21/47217;
(Continued)

(56) References Cited

U.S. PATENT DOCUMENTS 7,908,362 B2   3/2011  Ferguson et al.
9,055,268 B2   6/2015  Viveganandhan et al.
(Continued)

OTHER PUBLICATIONS

Ansley, Carol; The Economic Drivers of Cloud-Based DVR Services (2013).
(Continued)

*Primary Examiner* — Pankaj Kumar
*Assistant Examiner* — Alazar Tilahun
(74) *Attorney, Agent, or Firm* — Merchant & Gould P.C.

(57) ABSTRACT

In one embodiment, a method, system and apparatus are described, for uniquely storing, in a memory, for each one user among a plurality of users which recorded a content item, at least one segment of the recorded content item, generating metadata at a metadata generator, the metadata generator configured to associate, for one user among the plurality of users, the at least one segment of the recorded content item recorded by the one user, the metadata including a bitmap uniquely identifying the one user, and determining, at a processor, for each one user of the plurality of users, at least one offset value indicating at least one starting point for the at least one segment of the recorded content item for the one user, the at least one segment of the one user being disposed in a media sequence including a plurality of segments of the content item for different users of the users that recorded the content item, the at least one offset value being determined based, at least, on the bitmap uniquely identifying the one user and a byte size of the at least one segment of the recorded content item. Related methods, systems and apparatuses are also described.

19 Claims, 6 Drawing Sheets

(51) Int. Cl.
  *H04N 21/262* (2011.01)
  *H04N 21/658* (2011.01)
  *H04N 21/2387* (2011.01)
  *H04N 21/231* (2011.01)
  *H04N 21/845* (2011.01)
  *G11B 27/034* (2006.01)
  *H04N 21/433* (2011.01)

(52) U.S. Cl.
  CPC ... *H04N 21/2387* (2013.01); *H04N 21/23109* (2013.01); *H04N 21/26258* (2013.01); *H04N 21/4334* (2013.01); *H04N 21/6581* (2013.01); *H04N 21/8456* (2013.01)

(58) Field of Classification Search
  CPC ......... H04N 21/64769; H04N 21/6587; H04N 9/80; H04N 21/2323; H04N 21/2747; H04N 21/4532; H04N 21/482; H04N 21/2365; H04N 21/4147; H04N 21/2187; H04N 21/231; H04N 21/23406; H04N 21/23805; H04N 21/4334; H04N 21/43622; H04N 21/47202; H04N 21/8456; H04N 21/23109; H04N 21/2353; H04N 21/6581; H04N 21/387; H04N 21/26258
  See application file for complete search history.

(56) References Cited

U.S. PATENT DOCUMENTS

| | | | |
|---|---|---|---|
| 9,112,943 B1 * | 8/2015 | Vulkan | H04N 21/8352 |
| 2009/0222848 A1 * | 9/2009 | Ramaswamy | H04H 20/31 |
| | | | 725/9 |
| 2013/0145410 A1 * | 6/2013 | Major | H04N 21/2323 |
| | | | 725/109 |
| 2014/0013368 A1 | 1/2014 | Barrett | |
| 2014/0237525 A1 | 8/2014 | Rothschild et al. | |
| 2015/0142953 A1 * | 5/2015 | Bayen | H04L 67/22 |
| | | | 709/224 |

OTHER PUBLICATIONS

GitHub, Inc.; EverythingMe Kickass-Redis Bitcount Example (2015) Can be seen at: https://github.com/EverythingMe/kickass-redis/blob/master/example/bitcount_example.py.
Wikipedia; Cohort Analysis (2015) Can be seen at: https://en.wikipedia.org/wiki/Cohort_analysis.
The Apache Software Foundation; Apache Zookeeper (2010) Can be seen at: https://zookeeper.apache.org.
Getspool; Redis Bitmaps—Fast, Easy, Realtime Metrics (Nov. 29, 2011).
Newton, Harry; Newton's Telecom Dictionary (2014).

* cited by examiner

METHOD AND SYSTEM FOR SEGMENT BASED RECORDING

RELATED APPLICATION INFORMATION

The present application claims the benefit of priority from U.S. provisional patent application Ser. No. 62/238,727, filed 8 Oct. 2015.

TECHNICAL FIELD

The present disclosure generally relates to cloud DVR storage.

BACKGROUND

A DVR (Digital Video Recorder, sometimes also referred to as a PVR, Personal Video Recorder) is a consumer electronics device or application software that records video in a digital format to a disk drive, USB flash drive, SD memory card, solid state drive (SSD) or other local or networked mass storage device.

Cloud storage is a model of data storage where the digital data is stored in logical pools, the physical storage may span multiple servers (and often locations), and the physical environment is typically owned and managed by a cloud storage provider. Cloud storage providers are responsible for keeping the data available and accessible, and the physical environment protected and running.

Cloud DVRs are similar to non-cloud DVRs, except that the storage function of the DVR has been removed to cloud storage. Typically, in such a model, a service provider which provides video to a subscriber also provides cloud based storage for the subscriber. While previous generations of cloud DVR solutions targeted the capture and storage of MPEG transport stream (TS) Media over IP Multicast, the next generation of IP based cloud DVR solutions is trending towards the capture and playback of time-series media objects transported over reliable transport (e.g. as adaptive bitrate content delivered over HTTP).

As a result of various court decisions and other legal constraints imposed by various regulatory agencies in the U.S.A., one copy of a recorded content item per recording user needs to be maintained by the service provider in a cloud storage environment. For example, if one thousand users all record a television program broadcast at one particular time, then the service provider would need to store one thousand copies of the recorded television program in cloud storage. When the Recording is based on time-series objects (i.e. discrete video "chunks", as will be explained below), each user's copy of a discrete time-series object needs to be stored at a unique location in memory.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

A method, system and apparatus are described, for uniquely storing, in a memory, for each one user among a plurality of users which recorded a content item, at least one segment of the recorded content item, generating metadata at a metadata generator, the metadata generator configured to associate with the one user, for each one user among the plurality of users, the at least one segment of the recorded content item recorded by the one user, the metadata including a bitmap uniquely identifying the one user, and determining, at a processor, for each one user of the plurality of users, at least one offset value indicating at least one starting point for the at least one segment of the recorded content item for the one user, the at least one segment of the one user being disposed in a media sequence including a plurality of segments of the content item for different users of the users that recorded the content item, the at least one offset value being determined based, at least, on the bitmap uniquely identifying the one user and a byte size of the at least one segment of the recorded content item. Related methods, systems and apparatuses are also described.

Exemplary Embodiments

Figure 1:
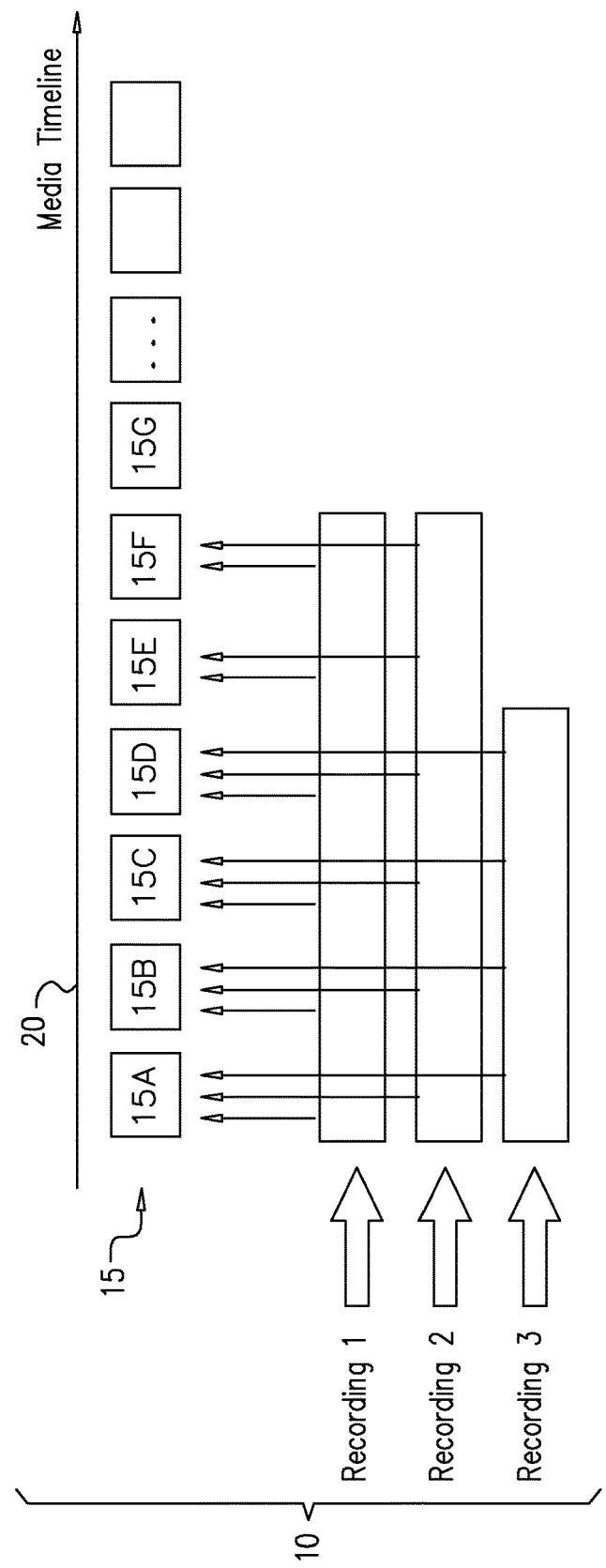
FIG. 1 is a simplified pictorial illustration of a system for segmented recording of time-series objects constructed and operative in accordance with an embodiment of the present invention.

Reference is now made to FIG. 1 which is a simplified pictorial illustration of a system 10 for segmented recording of time-series objects 15 constructed and operative in accordance with an embodiment of the present invention. The current trend is for providing video in IP based cloud DVRs involving the capture and playback of time-series media objects (such as time-series objects 15) transported over reliable transport (e.g. HTTP). Under the present regulatory regime in the U.S.A., one copy of the content needs to be stored for every subscriber which recorded a copy of the content on the cloud DVR. One method of storing one copy per user/recorder entails using an HTTP object PUT method with a special header which specifies a count indicating the number of copies of each of the time-series objects 15 to be written to storage. The recorded object (or individual recorded objects) can later be retrieved with an HTTP object GET method specifying a header which indicates an index of the copy to be retrieved.

By way of example, a television program is typically viewed linearly over time. The television program may be thought of as a live media object to be segmented over time as time-series objects 15. In FIG. 1, the time element is indicated by media timeline 20. The media time-series objects 15 can be segmented and prepared by a linear packager function and then delivered. Thus, a first segment of a media time-series object 15 is denoted 15A, a second segment of a media time-series object 15 is denoted 15B, and so forth. As is typical in adaptive bitrate protocols, a manifest is used to describe the time-series objects 15.

A URL template (i.e. a way to specify a URL including parameters that need to be substituted before the URL may be resolved, as is known in the art) may be used to download (to the cloud DVR) the objects corresponding to any timestamps announced in an adaptive bitrate manifest. The system 10 can be configured to or set to record segments originated by the linear packager. The system 10 maps the start and end-time of the recording to the object time stamps that are announced in the manifest.

FIG. 1 depicts how multiple users record a series of segments 15A, . . . 15F. By way of example, three different users might each be recording the same program. A first user, User 1, would be creating Recording 1; a second user, User 2, would be creating Recording 2; and third user, User 3, would be creating Recording 3. Each of the time-series objects 15 maps to a time span within the media to be recorded (i.e. the program). For example, each one of the time-series objects 15 depicted in FIG. 1 might represent a media segment spanning 2 seconds of time.

In the depiction of FIG. 1, User 1 and User 2 both record segments 15A-15F, inclusive, of the time-series objects 15. However, User 3 only records segments 15A-15D, inclusive, of the time-series objects 15. (As a practical matter, it is appreciated that it is not likely that a user will record 8 or 12 seconds of a linear television flow. However, the details of implementation would be the same whether the users are recording 8 or 12 seconds or 8 or 12 hours of the content). Additionally, there may be several hundred thousand users (as opposed to three) with varied interest in a subset of these segments.

Figure 2:
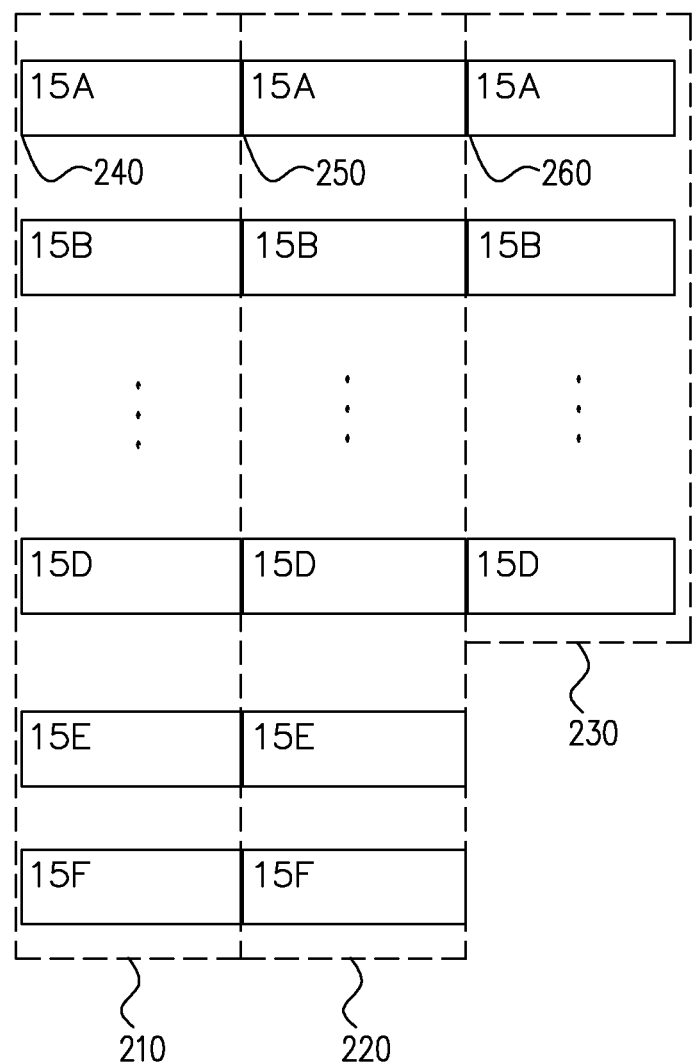
FIG. 2 is a representation of segments (i.e. time-series objects) of FIG. 1 as stored in a cloud DVR storage system.

Reference is additionally now made to FIG. 2, which is a representation of segments 15A, . . . , 15F of FIG. 1 as stored in a cloud DVR storage system. FIG. 2 is provided to further explicate the storage of the time-series objects 15 discussed FIG. 1. As has already been noted, the service provider needs to store one copy (i.e. one instance) of the parts of a television program which are recorded by a user in cloud storage for each user which recorded the program. User 1, in creating Recording 1 (block 210), creates a copy of time-series object 15 segments 15A, . . . , 15F. Similarly, User 2 in creating Recording 2 (block 220), creates a copy of time-series object 15 segments 15A, . . . , 15F. However, User 3, in creating Recording 3 (block 230), has only recorded time-series object 15 segments 15A, . . . , 15D.

A first instance of each time series object segment 15A, . . . , 15F therefore has a first location on the cloud storage disk, and each subsequent instance of the time-series object has an offset from the first location. By way of example, the first instance of segment 15A appearing in FIG. 2 begins at the first location 240 on the cloud storage disk. This particular instance of time-series object 15A is associated with Recording 1, namely, the recording created by User 1 (block 210). The second instance of time-series object 15 segment 15A begins with the offset 250 necessitated by being preceded by the first instance of segment 15A (namely the instance of segment 15A associated with User 1's recording (block 210)). This second instance of segment 15A is associated with Recording 2, namely, the recording created by User 2 (block 220). Likewise, the third instance of segment 15A begins with the offset 260 necessitated by being preceded by the first and second instance of segment 15A (namely the instance of segment 15A associated with User 1's recording (block 210) and User 2's recording (block 220)). This third instance of segment 15A is associated with Recording 3, namely, the recording created by User 3 (block 230).

Figure 3:
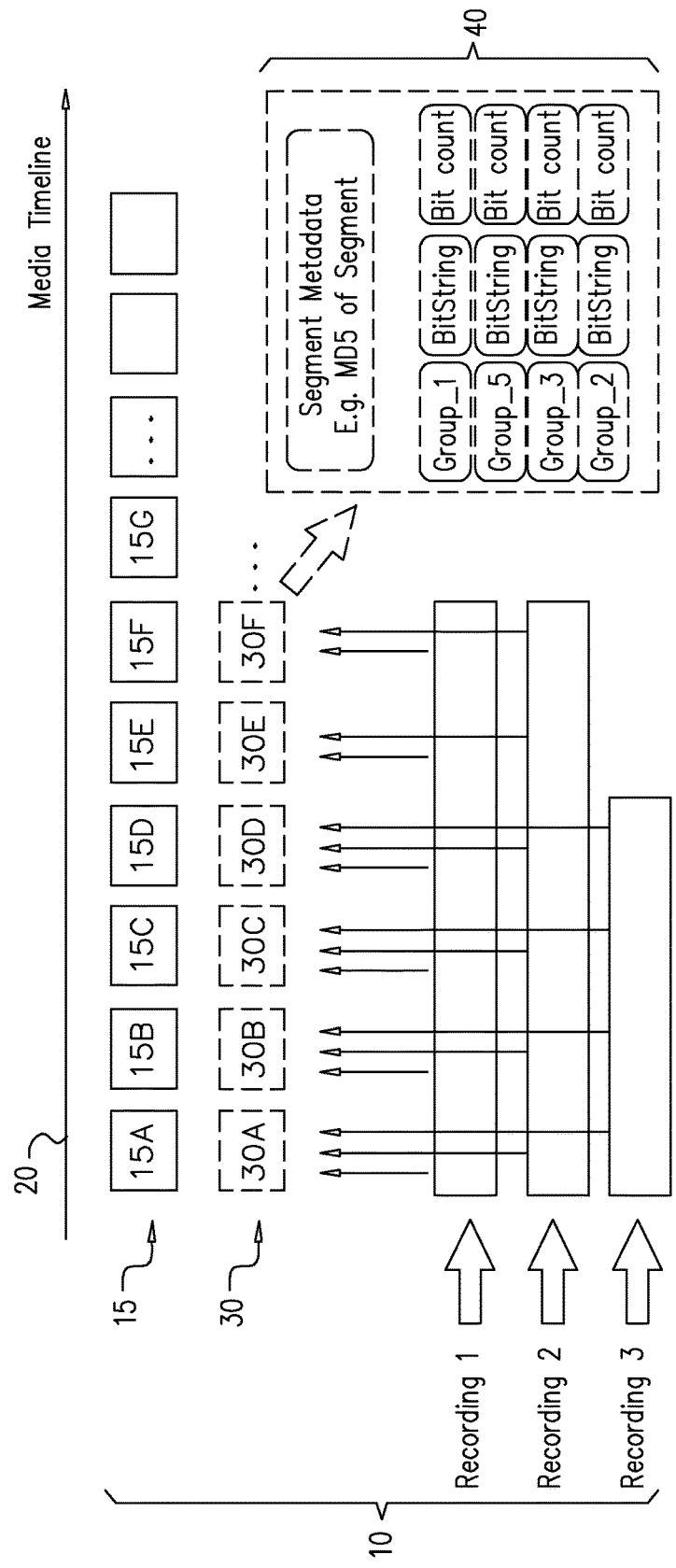
FIG. 3 is a simplified pictorial illustration of a sub-system for segmented metadata encoding within the system depicted in FIG. 1.

Reference is now made to FIG. 3, which is a simplified pictorial illustration of a sub-system for segmented metadata 30 encoding within the system 10 depicted in FIG. 1. In order for the cloud DVR to locate the time-series objects 15 when the user wants to play back the recorded content, the system 10 creates segmented metadata 30 to be stored in association with the recorded time-series objects 15A-15G as they are recorded. Each metadata object 30A, . . . , 30F is stored by the cloud DVR, and is associated with its corresponding time-series object 15. So, by way of example, time-series object 15A is associated with metadata object 30A; time-series object 15B is associated with metadata object 30B; and so forth.

The contents 40 of the segmented metadata 30 is explained in greater detail below. The metadata objects 30A, . . . , 30F are used to supplement the actual media segment (i.e. segments 15A, . . . , 15F) in cloud storage. It is appreciated that the metadata 30 is stored on a per segment (15A-15G) basis to capture a user created recording of the segment 15A-15G. The encoded structure of the metadata objects 30A, . . . , 30F can be used to track a user having created a recording of a given segment as well as determine the user's copy of the segment in disk. Thus, in keeping with the example of FIG. 1, a metadata object such as metadata object 30A, which is associated with segment 15A would be created specifically for User 1's Recording 1. A distinct metadata object 30A, which is associated with segment 15A would be created specifically for User 2's Recording 2. It is appreciated that, in some embodiments, an encoded structure of the metadata for a given segment captures a request of a user (such as User 1 or User 2) to create a recording of the corresponding segment. This is explained in greater detail below, with reference to FIG. 5, where metadata creation is discussed in greater depth.

Figure 4:
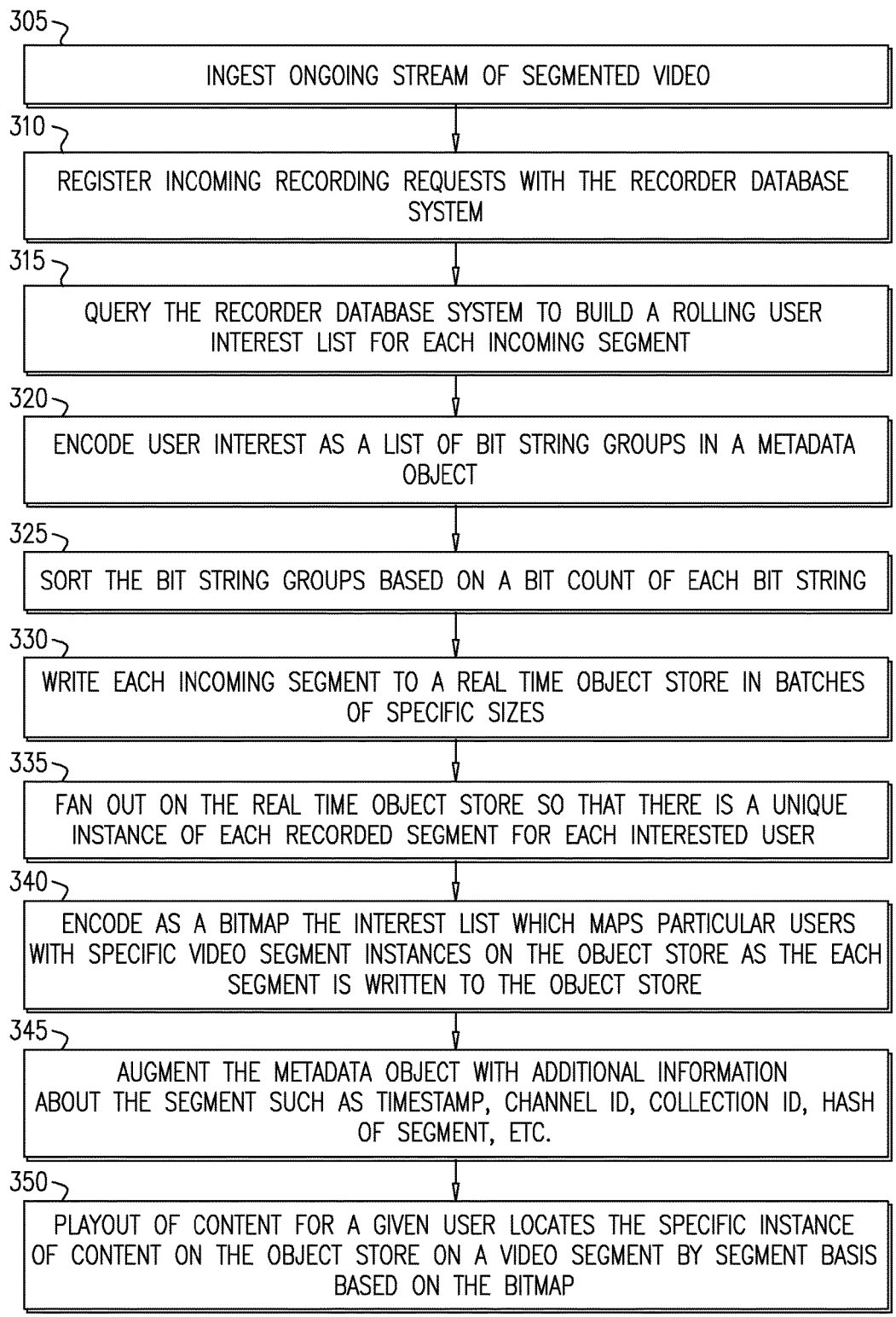
FIG. 4 is a flowchart summarizing the steps performed by a virtual recording service for the implementation of the system for segmented recording of time-series objects of FIG. 1.

Reference is now made to FIG. 4, which is a flowchart summarizing the steps performed by a virtual recording service for the implementation of the system 10 for segmented recording of time-series objects of FIG. 1. FIG. 4 is explained in more detail below with reference to FIG. 5. In step 305, the virtual recording service ingests an ongoing stream of segmented video. It is appreciated that this step is performed on an ongoing basis.

In step 310, recording requests which are incoming from users of the system 10 (FIG. 1) are registered with a virtual recording service database system. These incoming requests are understood as expressions of user interest in having the content item recorded on the user's behalf. Hence, these requests may also be referred to below in terms of "user interest". In step 315, the virtual recording service queries the virtual recording service database system in order to build a rolling user interest list for each incoming segment. In step 320, user interest is encoded by the virtual recording service as an interest list of bit string groups in a metadata object.

The bit string groups are then sorted based on a bit count of each bit string (step 325). In step 330, each incoming segment is written to a real time object store in batches of specific sizes. The real time object store is then fanned out, so that there is a unique instance of each recorded segment for each interested user (step 335). In step 340, the interest list which maps particular users with specific video segment instances is encoded as a bitmap on the object store as the each segment is written to the object store.

In step 345, the metadata object is augmented with additional information about the segment such as timestamp, channel ID, collection ID, a hash of the segment, etc. In step 350, a given user's specific instance of a segment can be located for playout on the object store on a video segment by segment basis based on the bitmap. A detailed of the above operations is now provided.

Figure 5:
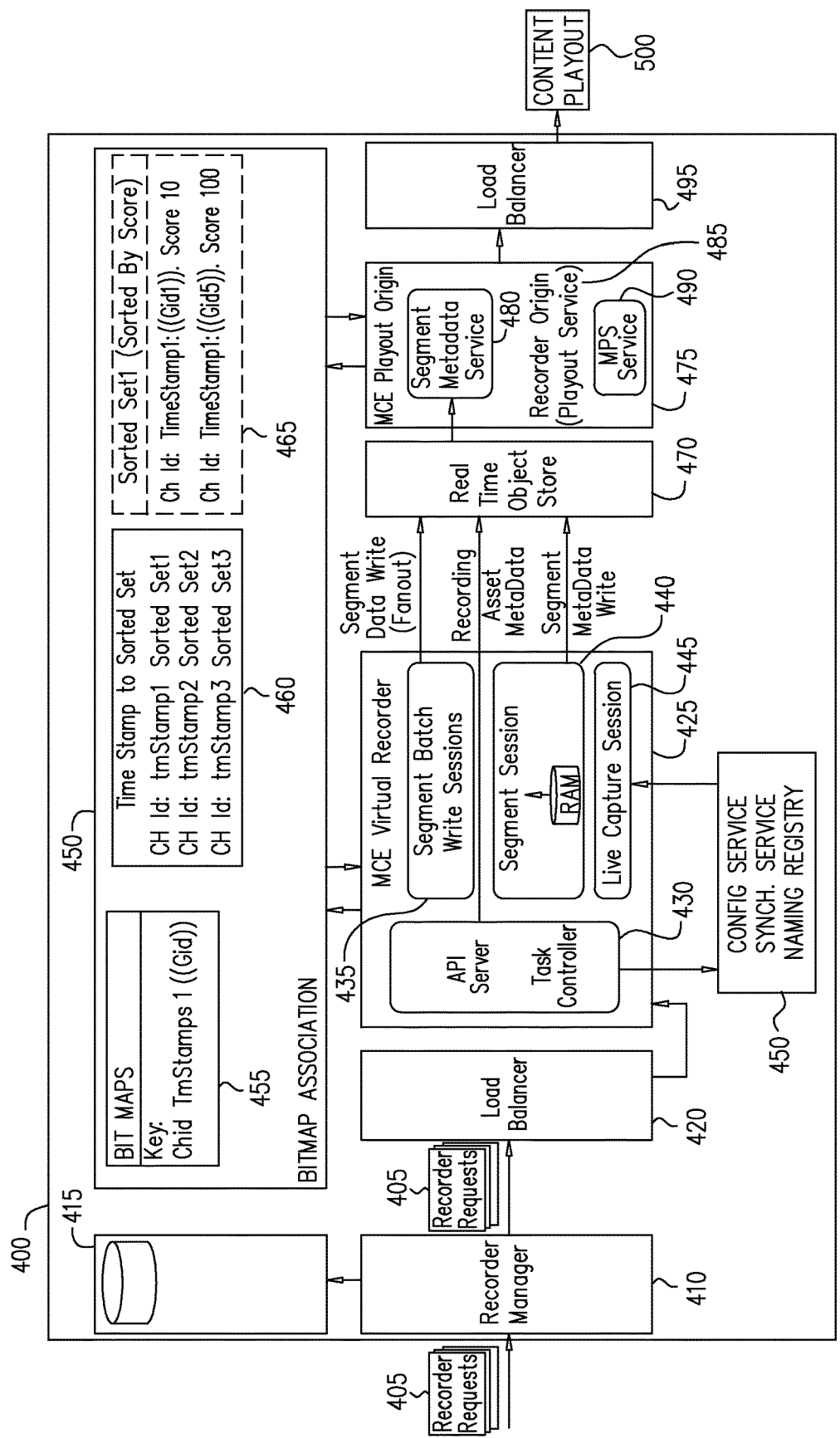
FIG. 5 is a detailed depiction of the virtual recording service of FIG. 4.

Reference is now made to FIG. 5, which is a detailed depiction of the virtual, cloud based, recording service 400 of FIG. 4. The virtual, cloud based, recording service 400 operates to create segmented recording of time-series objects 15 of FIG. 1. A user submitted request 405 to record content arrives at the system 400. By way of example, the user might press record on a remote control device associated with a physical DVR. Pressing record would invoke the system 400 of FIG. 5 to create the cloud recording of the desired content in response, for instance, to the user pressing record on a DVR's remote control. The request 405 is received at a recorder manager 410. The recorder manager 410 ensures that the proper content is stored as segments 15A, . . . , 15F (FIG. 1) on the cloud storage 415. The cloud storage may comprise physical disk drives, solid state drives, flash memory devices, or other physical storage devices, as are known in the art.

In addition, the recorder manager 410 passes along all such user submitted requests 405 to record various content items to a load balancer 420. The load balancer 420 passes the one such user submitted request 405 to one of a plurality of media capture engines (MCE). The MCE comprises a function which is called to implement a virtual recording function 425.

The MCE virtual recorder 425 comprises an API server 430 which parses the received request 405. Recording the desired content requires the API server 430 to initiate a segment download session (in case the segment download does not already exist) for a live stream (corresponding to time-series objects 15 flowing along the media timeline 20 of FIG. 1). The live capture session 445 process captures the ongoing live session. Metadata about the ongoing live session is recorded to storage (i.e. RAM) by a segment session 440 process. The actual live data which is recorded is written to storage by a segment batch write sessions 435 process.

The segment session state 450 is maintained in a configuration service, a synchronization service, and a naming registry. Such services and registry may be provided by Apache Zookeeper (see: zookeeper.apache.org), or other products which may be available to provide similar resources, such as ETCD (see: github.com/coreos/etcd) or Consul (see: www.consul.io).

The MCE virtual recorder 425 encodes, in the metadata 30 (FIG. 3), a record of the user having created a recording of a segment of a particular content item. The creation of the metadata objects 30A, . . . , 30F (FIG. 3) entails invoking an application programming interface (API) which typically will include the following attributes:
  a unique numeric identifier for a recording (i.e. a recording ID);
  a media presentation description (MPD) for use in the MPEG-DASH protocol (ISO/IEC 23009-1:2012, typically including, at least, the following components of segment information: segment timing; URL of the segment; segment media characteristics, such as video resolution and bit rates. It is appreciated that although the present discussion focuses on MPEG-DASH, the implementation may also be adapted to the HSS, HLS, and HDS, as well as other protocols for adaptive bitrate video delivery;

a channel ID (which may be derivable from the URL in the MPD);
  recording start time; and
  recording end time.

It is appreciated that if a given user were to request a recording of a content item which is broadcast at a given time, say, 9:00-10:00 PM Sunday, then the recording start time would be 9:00 PM Sunday, and the recording end time would be 10:00 PM Sunday. MPD, by contrast, provides segment timing. If the MPD segment start and end time are within the recording start/end time, then the segment is recorded for the user. Otherwise, the segment is not recorded.

The recorded data is kept, for management purposes, in groups, for example, in groups of 1000 recorded segments per group. So, for instance, if 50,001 instances of the same content were to be recorded, and the recording is to be recorded in groups of 1000, then, there would be 51 such groups. The API Server 430 will convert the Recording Id in to a Group Id and Group Index (The Group Index is determined by performing a calculation such as: Recording Id/Group_Count (the Group Count might be 1000, for example), thereby yielding a Group Id. Then, determining User Id Mod Group_Count=Group Index). Accordingly, the first 1000 users copies of the content would be in the first group, and, have GROUP ID=1. The second 1000 users copies of the content would be in the second group, and, have GROUP ID=2, and so forth. So a first user's recorded copy of the content may be in GROUP ID=3, instance 785. A second user's recorded copy of the content may be in GROUP ID=22, instance 345. This information can be encoded in a bitmap associated with each of the segments 15A, . . . , 15F (FIG. 1) and stored in the corresponding metadata object 30A, . . . , 30F (FIG. 3). Thus, by way of example, the instance of segment 15A for User 2's Recording 2 would have an appropriate bitmap in its metadata object 30A indicating that this particular instance of segment 15A is for User 2's Recording 2. Such a bitmap conversion is performed by one of: a custom tool; a tool which may be found for download on the internet; or alternatively, a commercially available tool. One such commercially available tool would be the Redis Data Structure Server (see more details at: redis.io). The Redis Data Structure Server is an open source, BSD licensed, advanced key-value cache and store. It is often referred to as a data structure server since keys can contain strings, hashes, lists, sets, sorted sets, bitmaps and hyperlog logs. Redis enables the use of a bitcount operation, which are performed on bitmaps 455. It is appreciated that other data structure server environments have corresponding operations, and may be used instead of the Redis Data Structure Server. The Bitmaps 455 are created by the tool (such as the Redis Data Structure Server), and associated with other relevant metadata, including timestamps 460 and scores 465. The scores 465 are a total offset in a bitmap which are populated with bitmap values for users who have recorded data. Thus, for example, if a given service has 100,000 subscribers, a bitmap 100,000 bits in length is used to store subscriber requests to recorded a given content item. If, for the sake of example, looking only at the first eight bits of the 100,000 bit bitmap, subscribers associated 1, 3, 5 and 7 wanted to record the content item, then the first eight bits of the bitmap would be: 10101010. The total number of instances of each segment that need to be recorded can then be determined by counting the total number of bits set to 1 (one) in the bitmap. Thus, an offset from the start of the bitmap may locate a bit associated with a particular user.

Accordingly, in greater detail, for each second (or other appropriate time period) from recording start time to recording end-time, the segment batch write sessions 435, segment session 440, and live capture session 445 perform the following steps (provided as pseudocode, and assuming a Redis environment):

```
do
      Update    BitMap    with    Key    =
   ChannelId:TimeStamp(InSeconds) :GroupId ==> Set Bit at index
   => Group Index { Use Redis SETBIT }
      Create/Update SortedSet (if one does not exist for
   the TimeStamp ) -> add the BitMap Key to the SortedSet and
   use the Bit Count as the Score
done
```

The SORTED SET referred to in the above block of pseudocode refers to a table of batch IDs.

The segment batch write sessions 435, segment session 440, and live capture session 445 wait for the capture session to start and then perform an HTTP Get in order to capture the MPD Metadata and to create a Metadata File in real time object store 470. As described above, the metadata file describes the timeline and other information of the given user's recording. As the live capture session proceeds, for each segment which is downloaded the segment batch write sessions 435, segment session 440, and live capture session 445 perform the following steps:

The following information is collected, and may be added to the metadata:
  A time stamp of the segment;
  A channel ID for the segment;
  A collection ID for the segment identifying video parameters which may vary depending on the intended playout device, the sound quality, and so forth. For example, one instance of the content may be recorded as high definition video. A second instance may be recorded for playout on a mobile phone. A third may be recorded with Dolby sound, while a fourth may be recorded in stereo; and
  A hash of the segment (such as an MD5 hash; a SHA-1 hash; or a SHA-256 hash).

For each sorted set, Bitmaps of subscribers for whom the content is to be recorded is collected and recorded in the sorted set. The sorted set is finalized once the time of the segment to be recorded is past. That is to say, for a two second segment of content, any subscriber who pressed Record after the present segment has begun to be processed will be pushed into the following sorted set. It is appreciated that in a Redis environment the sorted set may comprise a ZSET.

Create a Final Write Group (i.e. the instances of the content are recorded only for those subscribers who have requested a recording of the content). Collect all bitmaps in the sorted set (A Cumulative bit count is the total number of copies which are needed to be made for a given segment). A calculation may then be performed: Total Bit Count/Batch Size=the total number of batches—i.e. batches of segments to be written to storage.

A Grand Index is determined for to enable locating segments recorded by any given user for that given user. Thus, any given user's content will have a location which will be the Cumulative Count of all preceding GroupIds+the Bit count from the beginning to the current position within the user's group (i.e., use the BITCOUNT with Range to obtain the group offset). Since the user's bit position in the bit map of all users is known, and the bit count of all preceding bits across all groups of users is known, then a Grand Offset can be determined. The Grand Offset is the offset if we treat the write session as one large batch. Dividing the grand offset by the batch size results in the batch number for the given user's recorded session. The Grand Offset modulo batch size yields the batch index. This information can then be stored in the metadata, and used later to retrieve the content item.

A segment write session is then created for the segment to be recorded. The sorted set is serialized for every time stamp. The serialized sorted set is then written as segment metadata along with the other Segment Specific Information collected earlier (i.e. segment timing; URL of the segment; segment media characteristics, such as video resolution and bit rates).

The sorted set is typically kept in situ for several hours, which is useful for determining the playout origin in cases of recordings which are either in progress or recently recorded popular recordings.

It is appreciated in the above description that the content to be recorded is recorded in segments along with appropriate metadata, comprising a segment name, segment start time, and segment end time. The recorder manager 410 sends large numbers of such metadata to the load balancer 420 which distributes this information amongst available instances of the MCE virtual recorder 425.

A user submitted request to playback the recording which arrives at the system would be processed in a similar way. The MCE comprises a cloud based playback function which is called to implement a playout origin function 475. The playout origin function 475 comprises a segment metadata service 480, which, when a playout request for a given recording arrives loads the metadata from object store 470 and obtains the timeline. As was noted above, each segment of a recorded content item has an associated start and end time, as well as stored source information. The stored segments are stored ordered based on segment start and end time. If 5737 instances of the same content segment are stored (one for each of 5737 users who requested that the content be recorded), then all 5737 (identical segments) are stored consecutively. The following 5737 instances of the next segment (assuming that there are no additional recording request added in the duration) are then stored, and so forth. Thus, retrieving the segments in order to play them back in the proper order necessitates being able to locate the proper segments in the proper order.

Sorted sets are assembled from stored data (such as Redis data, for instance) for given timestamps. If the sorted sets are not available, they may be recreated, for example, when using Redis, from stored Segment Bit Maps. MPD based on the metadata for the requested recording is then created. Segment Requests are then resolved to the Batch number and Batch Index. Accordingly the requested segment is retrieved from the object store 415 and played back.

A second load balancer 495 ensures that a single playout request is handled by a single play out service 485. Finally, the user's client device receives content segments 500 which is played out on the client device. It is appreciated that the content segments 500 to be played out correspond to the recorded versions of time-series objects 15A, . . . , 15F (FIG. 1).

It is appreciated that each of the processes described herein may be executed by a special purpose processor designed to execute those processes, or, they may be executed by a general purpose processor or processors. For example, and without limiting the generality of the foregoing, the offset value is typically determined by a processor. Similarly, the metadata may be generated in a specially designed hardware module, a specially implemented processor, or in a general purpose processor. In addition to the processor, the system described herein typically comprises non-transitory computer-readable storage media (i.e. memory). The memory may store instructions, which at least one of the processors may execute, in order to perform the method described herein. The system also comprises typical and standard hardware and software components as are known in the art.

Figure 6:
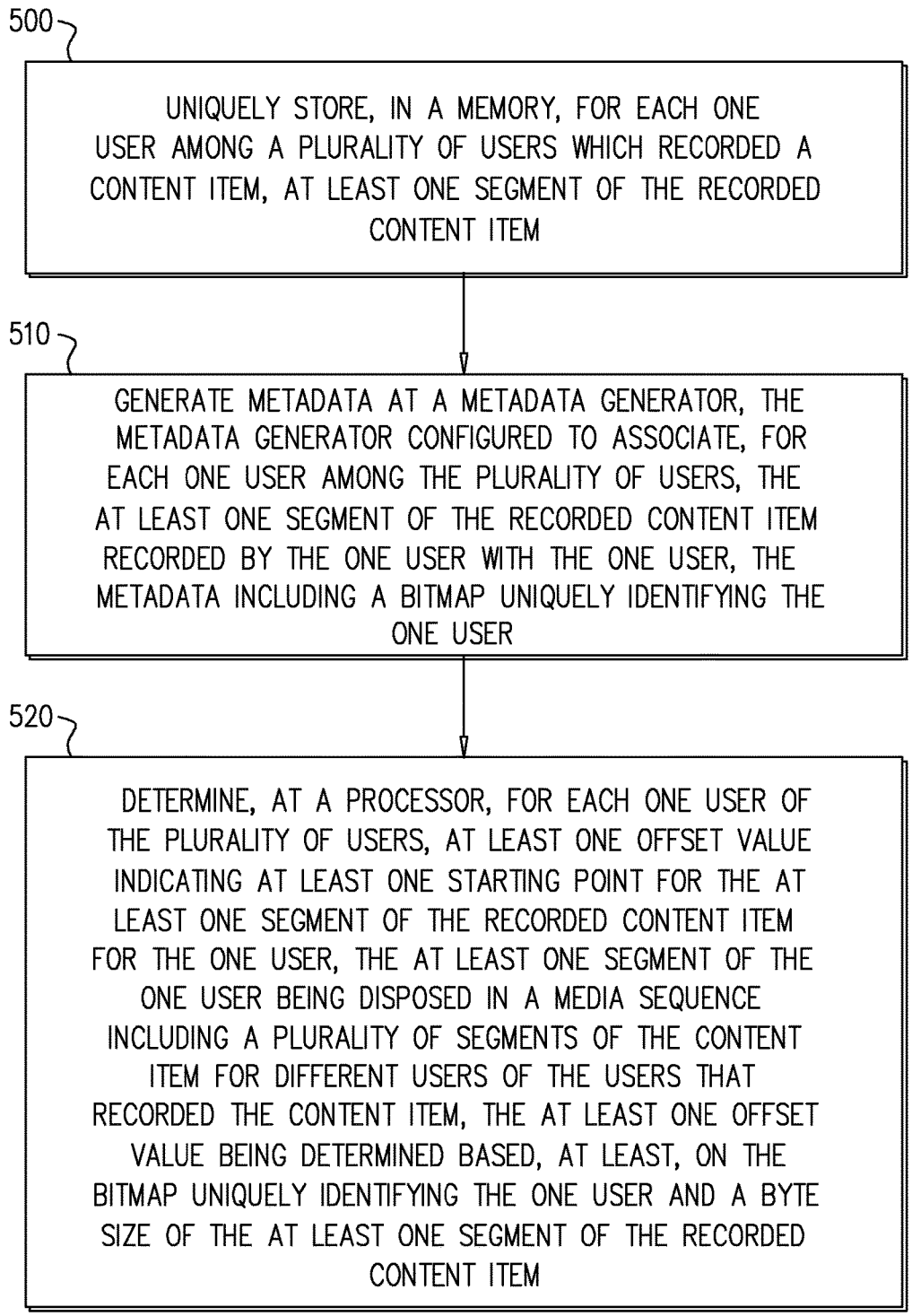
FIG. 6 is a flowchart of an exemplary method for implementing the system of FIG. 1.

Reference is now made to FIG. 6, which is a flowchart of an exemplary method for implementing the system of FIG. 1. In step 500, the system will uniquely store, on a cloud DVR, for each one user among a plurality of users which recorded a content item, at least one segment of the recorded content item. The system will then, at step 510, generate metadata at a metadata generator, the metadata generator configured to associate, for each one user among the plurality of users, the at least one segment of the recorded content item recorded by the one user with the one user, the metadata including a bitmap uniquely identifying the one user. The system will then determine, at step 520, at a processor, for each one user of the plurality of users, at least one offset value indicating at least one starting point for the at least one segment of the recorded content item for the one user, the at least one segment of the one user being disposed in a media sequence including a plurality of segments of the content item for different users of the users that recorded the content item, the at least one offset value being determined based, at least, on the bitmap uniquely identifying the one user and a byte size of the at least one segment of the recorded content item.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

The invention claimed is:

1. A system comprising:
a memory for storing executable program code; and
a processor, functionally coupled to the memory, the processor being responsive to computer-executable instructions contained in the program code and operative to:
receive a first request to record a first segment of a media content from a first user, in response to receiving the first request, first metadata comprising a first bitmap array uniquely identifying the first user as a unique member of a first group of users among a plurality of groups of users;
determine, for the first user, a first offset value indicating a first starting point for the first segment, the first offset value being determined based, at least, on the first bitmap array uniquely identifying the one user and a byte size of the at least one segment of the recorded content item;
receive a second request to record the first segment of the media content from a second user;
generate, in response to the second request, second metadata for the first segment, the second metadata comprising a second bitmap array uniquely identifying the second user as another unique member of the first group of users;
create a segment metadata for the first segment, the segment metadata comprising a first group ID corresponding to the first group of users, a bitstring array comprising bits of the first bitmap array and the second bitmap array, and a bit count of the bitstring array; and
create a write session for the first segment based on the bit count of the bitstring array.

2. The system of claim 1 wherein the media content is optimized for download as an adaptive bitrate content item.

3. The system of claim 1 wherein the first metadata comprises a result of a hash function operation performed on the first segment.

4. The system of claim 1 wherein the first bitmap array is one of a group of bitmap arrays, wherein each group of bitmap arrays is associated with one group of users among the plurality of groups of users.

5. The system of claim 1 wherein the first metadata associated with the first segment is stored separately from the first segment.

6. The system of claim 1 wherein the system comprises a cloud based recording service.

7. The system of claim 1 wherein the memory comprises at least one of a physical disk drive; a solid state drive; a cloud based memory; and a flash memory device.

8. The system of claim 1 wherein the first metadata which associates the first segment of the media content with the first user comprises:
a unique numeric identifier for a recording;
a media presentation description (MPD);
a channel ID;
a recording start time; and
a recording end time.

9. The system of claim 1 further comprising a cloud based playback mechanism.

10. A method comprising:
receiving from a first user a first request to record a first segment of a media content;
generating, in response to receiving the first request, first metadata for the first segment, the first metadata comprising a first bitmap array uniquely identifying the first user, as a unique member of group of users among a plurality of groups of users;
determining for the first user a first offset value indicating a first starting point for the first segment, the first offset value being determined based, at least, on the first bitmap array uniquely identifying the first user and a byte size of the first segment of the media content;
receiving a second request to record the first segment of the media content from a second user;
generating, in response to receiving the second request, second metadata for the first segment, the second metadata comprising a second bitmap array uniquely identifying the second user as another unique member of the first group of users among the plurality of groups of users;

creating a segment metadata for the first segment, the segment metadata comprising a first group ID corresponding to the first group of users, a bitstring array comprising bits the first array and the second array, and a bit count for the bitstring array; and creating a write session for the first segment based on the bit count for the bitstring array.

11. The method of claim 10 wherein the media content comprises a content item which is optimized for download as an adaptive bitrate content item.

12. The method of claim 10 wherein the first metadata further comprises a result of a hash function operation performed on the segment.

13. The method of claim 10 wherein the first bitmap array is one of a group of bitmap arrays, wherein each group of bitmap arrays is associated with one group of users among the plurality of groups of users.

14. The method of claim 10 wherein the first metadata associated with the first segment is stored separately from the first segment.

15. The method of claim 10 wherein the memory comprises at least one of a physical disk drive; a solid state drive; a cloud based memory; and a flash memory device.

16. The method of claim 10 wherein the first metadata which associates the first segment with the first user further comprises:
 a unique numeric identifier for a recording;
 a media presentation description (MPD);
 a channel ID;
 a recording start time; and
 a recording end time.

17. A non-transitory computer readable storage medium comprising computer-executable instructions which, when executed by a computing device, will cause the computing device to perform a method comprising:
 receiving from a first user a first request to record a first segment of a media content;
 generating, in response to receiving the first request, first metadata for the first segment, the first metadata comprising a first bitmap array uniquely identifying the first user, as a unique member of a first group of users among a plurality of groups of users;
 determining for the first user a first offset value indicating a first starting point for the first segment, the first offset value being determined based, at least, on the first bitmap array uniquely identifying the first user and a byte size of the first segment of the media content;
 receiving a second request to record the first segment of the media content from a second user;
 generating, in response to the second request, second metadata for the first segment, the second metadata comprising a second bitmap array uniquely identifying the second user as another unique member of the first group of users among the plurality of groups of users;
 creating a segment metadata for the first segment, the segmented metadata comprising a first group ID, a first bitstring array comprising bits the first bitmap array and the second bitmap array, and a first bit count for the first bitstring array; and
 creating a write session for the first segment based on the bit count for the first bitstring array.

18. The non-transitory computer readable storage medium of claim 17, wherein generating the first metadata comprises:
 creating a first recording ID for the first segment for the first user; and
 determining the first group ID from the first recording ID and a group count comprising a predetermined number of recorded segments per group.

19. The non-transitory computer readable storage medium of claim 17, wherein the method further comprises:
 receiving from a third request to record the first segment of the media content from a third user;
 generating, in response to receiving the third request, third metadata for the first segment, the third metadata comprising a third bitmap array uniquely identifying the third user as a unique member of a second group of users among the plurality of groups of users; and
 updating the segment metadata for the first segment, wherein updating the segment metadata comprises incorporating a second group ID, a second bitstring array comprising bits the third bitmap array, and a second bit count for the second bitstring array.

* * * * *